(12) United States Patent  (10) Patent No.: US 8,838,382 B2
Drysdale  (45) Date of Patent: Sep. 16, 2014

(54) METHOD OF PROVIDING NATURAL TOUR GUIDE FUNCTIONALITY TO LOCATION TRACKING COMPUTERIZED DEVICES

(71) Applicant: White Wolf Investments Pty Ltd, Frenchs Forest (AU)

(72) Inventor: John-Paul Drysdale, Frenchs Forest (AU)

( * ) Notice: Subject to any disclaimer, the term of this patent is extended or adjusted under 35 U.S.C. 154(b) by 65 days.

(21) Appl. No.: 13/674,079

(22) Filed: Nov. 11, 2012

(65) Prior Publication Data

US 2014/0136100 A1    May 15, 2014

(51) Int. Cl.
    *G01C 21/00*       (2006.01)
(52) U.S. Cl.
    USPC .......................... 701/461; 701/207; 340/988
(58) Field of Classification Search
    USPC .................................. 701/461, 207; 340/988
    See application file for complete search history.

(56) References Cited

U.S. PATENT DOCUMENTS

| | | | |
|---|---|---|---|
| 5,767,795 A * | 6/1998 | Schaphorst | 340/988 |
| 6,085,148 A | 7/2000 | Jamison | |
| 6,266,614 B1 | 7/2001 | Alumbaugh | |
| 6,360,167 B1 * | 3/2002 | Millington et al. | 701/516 |
| 6,456,234 B1 * | 9/2002 | Johnson | 342/357.48 |
| 6,526,351 B2 | 2/2003 | Whitham | |
| 6,731,238 B2 * | 5/2004 | Johnson | 342/357.48 |
| 6,845,321 B1 * | 1/2005 | Kerns | 701/426 |
| 7,124,024 B1 | 10/2006 | Adelaide | |
| 7,187,997 B2 * | 3/2007 | Johnson | 700/245 |
| 7,386,396 B2 * | 6/2008 | Johnson | 701/300 |
| 7,647,166 B1 * | 1/2010 | Kerns | 701/412 |
| 7,710,290 B2 * | 5/2010 | Johnson | 340/8.1 |
| 8,670,925 B2 * | 3/2014 | Gluck | 701/409 |
| 2003/0009281 A1 * | 1/2003 | Whitham | 701/211 |
| 2006/0002590 A1 * | 1/2006 | Borak | 382/104 |
| 2007/0005188 A1 * | 1/2007 | Johnson | 700/245 |
| 2008/0129528 A1 * | 6/2008 | Guthrie | 340/686.1 |
| 2008/0183385 A1 * | 7/2008 | Horn | 701/213 |
| 2010/0063726 A1 | 3/2010 | Marjenberg | |
| 2010/0318291 A1 * | 12/2010 | Gluck | 701/208 |

* cited by examiner

*Primary Examiner* — Mary Cheung
*Assistant Examiner* — Michael Berns
(74) *Attorney, Agent, or Firm* — Stephen E. Zweig

(57) ABSTRACT

An improved automated tour guide system and method, intended to be run on mobile computerized devices such as Smartphone and GPS equipped vehicle devices, designed to better mimic the natural ability of human tour guides to customize tour guides according to variations in user interests and preferences, and tour itineraries, provide more natural segues between various tour stories, and more realistically handle what geographic regions of interest are visible to the user. The system extensively annotates tour guide media with control and preference metadata, can utilize third party media obtained from remote servers, and intelligently utilizes geographic map data and user location, movement direction, and speed to control tour guide audio, text, graphic and URL output to users. The system further keeps track of user tour location and media playback history and can use this history to further optimize its performance.

19 Claims, 6 Drawing Sheets

| Position Link | Tour guide audio media | | Linked audio media | Playback Preferences | | Previously visited and played? | |
|---|---|---|---|---|---|---|---|
| - | ID # | Audio media contents | - | Creator | Topic | Visited | Played |
| 210 | ID 1 | Story about 210 | | System | Nature | Y | N |
| 214 | ID 2 | Story about 214 | | System | History | Y | N |
| 218 | ID 3 | Story about 218 | | System | Cultural | N | N |
| 222 | ID 4 | Story about 222 | | 3rd party | Commercial | N | N |
| 240 | 242 | 244 | 246 | 248 | 250 | 252 | 254 |

| Position Link | Tour guide audio media | | Linked story | Playback Preferences | | Previously visited and played? | |
|---|---|---|---|---|---|---|---|
| - | ID # | Audio media contents | - | Creator | Topic | Visited | Played |
| 210 | ID 1 | Story about 210 | | System | Nature | Y | Y |
| 214 | ID 2 | Story about 214 | | System | History | Y | Y |
| 218 | ID 3 | Story about 218 | | System | Cultural | Y | N |
| 222 | ID 4 | Story about 222 | | 3rd party | Commercial | N | N |
| 240 | 242 | 244 | 246 | 248 | 250 | 252 | 254 |

| Position Link | Tour guide audio media | | Linked story | Playback Preferences | | Previously visited and played? | |
|---|---|---|---|---|---|---|---|
| - | ID # | Audio media contents | - | Creator | Topic | Visited | Played |
| 210 | ID 1 | Story about 210 | | System | Nature | Y | Y |
| 214 | ID 2 | Story about 214 | | System | History | Y | Y |
| 218 | ID 3 | Story about 218 | | System | Cultural | Y | Y |
| 222 | ID 4 | Story about 222 | | 3rd party | Commercial | Y | N |
| 240 | 242 | 244 | 246 | 248 | 250 | 252 | 254 |

Figure 6

Tour guide audio media playback records for user preferences: "No history, No commercial"

| Position Link | Tour guide audio media | | Linked story | Playback Preferences | | Previously visited and played? | |
|---|---|---|---|---|---|---|---|
| - | ID # | Audio media contents | - | Creator | Topic | Visited | Played |
| 210 | ID 1 | Story about 210 | | System | Nature | Y | 1 |
| 214 | ID 2 | Story about 214 | | System | History | Y | 0 |
| 218 | ID 3 | Story about 218 | | System | Cultural | Y | 1 |
| 222 | ID 4 | Story about 222 | | 3rd party | Commercial | Y | 0 |
| 240 | 242 | 244 | 246 | 248 | 250 | 252 | 254 |

Tagged for later playback

Figure 7

Example of a first media file linked to a second media file

| Position Link | Tour guide audio media | | Linked story | Playback Preferences | | Previously visited and played? | |
|---|---|---|---|---|---|---|---|
| - | ID # | Audio media contents | - | Creator | Topic | Visited | Played |
| 210 | ID 1 | Story about 210 | - | System | Nature | N | N |
| 214 | ID 2 | 1st: Story about 214 | ID 3 | System | History | N | N |
| - | ID 3 | 2nd: Story of topic related to 214 | - | System | Related Topic | N | N |
| 218 | ID 4 | Story about 218 | - | System | Cultural | N | N |
| 222 | ID 5 | Story about 222 | - | 3rd party | Commercial | N | N |
| 240 | 242 | 244 | 246 | 248 | 250 | 252 | 254 |

METHOD OF PROVIDING NATURAL TOUR GUIDE FUNCTIONALITY TO LOCATION TRACKING COMPUTERIZED DEVICES

BACKGROUND OF THE INVENTION

1. Field of the Invention

This invention is in the field of automated tour guides and other computerized position (e.g. GPS) based devices that can play back tour guide audio narration and other media based, at least in part, on the user's geographic position or position history.

2. Description of the Related Art

With the advent of low cost, portable, computerized devices capable of audio output, as well as the advent of inexpensive methods of automatically determining position (e.g. Global Positioning System (GPS) systems), work in the field has, to some extent, focused on devising various types of travel guides that can automatically provide audio narration or other media (e.g. visual displays text or graphics) to a user as a user travels or "tours" to various locations.

Although in past years, earlier automated tour systems might comprise little more than a collection of stories stored on audio media, such as tape, and instructions for the user to move from one location (e.g. one museum location to another museum location); modern systems tend to be more capable.

More modern automated tour systems, exemplified by various "GPS based Audio Tour Systems" are often based on a combination of audio content, software and a GPS enabled, computer processor equipped, hardware device that provides users with information (often audio stories) in a manner that correlates with the user's current location.

Typically these audio tour systems may be used by tourists in the form of walking tours. Such walking tours are often confined to a small geographic area, and often there is only a limited amount of media content to cover. Although a few services have also used such GPS based audio tour systems for use in road vehicles, such systems often have limited flexibility in that the user must still follow a set route in order to obtain satisfactory tour guide results. That is, unlike a human tour guide, such prior art GPS based audio tour systems have a limited ability to provide a natural and compelling flow of information (e.g. coherently linked audio stories) when a user deviates from the path that the device was originally programmed for.

Prior art in this area includes Alumbaugh, U.S. Pat. No. 6,226,614, who taught a travel guide device that provided timely presentation of audio or visual information linked to a geographic point of interest.

Other prior art includes Adelaide et. al., U.S. Pat. No. 7,124,024 who taught a portable device supplying tourist information; Jamison et. al., U.S. Pat. No. 6,085,148 who taught various automated touring information systems and methods; Whitham, U.S. Pat. No. 6,526,351, who taught an interactive multimedia tour guide; Zulaikha, WO/2008/086574, who taught a contextually enhanced multi-channel location based tour guidance system; and others.

Nonetheless, despite such prior art, such automated tour guide methods are still not widely used, suggesting that further advances in this art would be useful.

BRIEF SUMMARY OF THE INVENTION

The invention is based, in part, on the insight that what is needed are improved methods for operating tour guide systems that can better replicate the intelligence and experience of a human tour guide. That is, a human tour guide is generally capable of judging the interests of his or her audience, variations in the tour schedule (i.e. unexpected detours, unexpected changes in speed, unexpected rest stops) and can generally weave together a series of audio stories about the various areas encountered by the tour into a compelling narrative.

Human tour guides can make stories short or long depending on circumstances, can choose to bring in additional background material or not depending on the audience and time available, and also direct the tour participants (users) to various areas of interest by providing helpful segue information such as "to your right we will see . . . ", or "two miles ahead and to the left we will pass . . . ", or even, after resuming a tour after a rest stop, "I didn't have time to mention this previously, but this morning we also passed . . . ."

An improved method of operating automated tour guide systems and devices might also incorporate this functionality. Such an improved method might, for example, while directing the user's attention to relevant points of interest and telling them entertaining and engaging stories relating to those land marks, also manage the flow of information in a smooth and logical manner.

In this specification, although various audio narrations or stories, often referred to as "tour guide audio media" will often be referred to as specific examples, it should be understood that the teaching of the present invention is broader than that, and can also encompass other tour guide media such as text, graphics (drawings), URL links, and the like, and may often comprise a mix of different tour media. For example, audio narration (stories) may be supplemented by graphics and text, or hyperlinks (e.g. URL links) to various internet websites, and the like.

According to the invention, and as will be discussed in more detail shortly, the invention may improve performance over the prior art through improvements in several areas. One area of improvement is that the invention is capable of departing from prior art tour guide methods, which typically were based on triggering tour guide media playback when the user entered a circular area with a given radius around a given geographic point of interest. Here, although the invention is capable of using such circular areas surrounding a point, the invention additionally is capable of being activated by more flexible triggering methods, such as polygons that can be more precisely shaped to accommodate real life landmarks, as well as more precisely accommodate when a given area of interest may actually be visible to the user.

The invention is also based, in part, on the insight that it would be also useful for such an improved system to provide intelligent audio segues to draw a user's location to various locations, including the previously discussed human-like location and direction cues such as "over to the left" or "two miles ahead" with regard to discussing interesting areas.

Additionally, such an improved system and method would more flexibly adapt to varying user tour guide topic preferences and other user preferences as well. Thus users with an interest in learning more about history could indicate this as a user preference, while users who lack such interests could instruct the system to skip playback of such information.

Thus, for example, in at least some embodiments, the invention may treat audio media stories and geographic locations as either separate but linked database records, or at least separate fields in a database record. The invention may also allow any given geographic location to be associated with one or more tour guide media files (e.g. audio media story files). The invention may also allow these different tour guide media files to be optionally linked with one another, as well as to be labeled or tagged with various types of metadata which can label the media according to various user playback preferences. Such user playback preferences can, for example, be controlled by many factors including the topic of the media, source of the media, priority of the media to the tour, and so on.

The invention is also based, in part, on the insight that it would be useful for the invention to further enable third party users to supplement the performance of the tour guide system by, for example, being able to add additional tour media (and the corresponding geographic trigger regions or points), to be played back (or not) by the system according to the user's actual tour itinerary and user preferences.

The invention is also based, in part, on the insight that it would be also useful for the invention to keep track of where the user has been, and what tour media has been previously played to the user. This way, the user can subsequently instruct the system to give a higher priority to the skipped tour media on subsequent trips. The user can also instruct the system to play back some or all of the skipped media during or after, rest stops, otherwise uneventful portions of the tour, or other times. Again, the net effect is to mimic the performance of a human tour guide, who may fill in a long portion of the tour between areas of interest with additional background or other stories that were previously skipped.

The invention is also based, in part on the insight that although in a preferred mode, the system may operate using GPS position data and comprehensive geographic map data (e.g. highly detailed map data such as provided by Google maps, Apple maps, Garman map data, and the like), it is also desirable for the system to operate in a fallback mode as well. Thus the system may be configured to alternatively or additionally operate with other methods of determining location (e.g. triangulation with earth-bound wireless transmitters and receivers, internal navigation methods etc.). The system may also be configured to alternatively or additionally operate with less comprehensive geographic map data, such as at one extreme operating (possibly with reduced functionality) with as little as a collection of geographic location points (e.g. GPS geographic location points).

Typically the invention may implement one or more of the above features thorough a computerized device, typically controlled by software. In this discussion, it should be assumed that the user benefitted by the method will typically have at least default values of a user (or user device) geographic location, movement direction, movement speed. This user will also have various user preferences, to be discussed.

The invention will often direct the device to provide the user with tour guide media (often tour guide audio media) in a controlled manner. This tour guide media (and associated metadata) will typically be obtained from computer memory (either stored in the device's memory, or elsewhere). The tour guide media will be usually linked with the circular areas around various geographic points of interest, or polygonal areas around various geographic regions of interest (here both will be described as geographic activation areas).

The invention will use the user's (e.g. user's device) past, present or future geographic location, movement direction, movement speed, user preferences, and at least minimal amounts of geographic map data, along with the various geographic activation areas, to determine which geographic activation areas the user is encountering or likely to encounter (here designated as user proximate regions of interest). These user proximate ranges of interest generally those geographic activation areas which are either presently within visual range or close proximity of the user, or which will shortly become within visual range or close proximity of the user.

The invention's method will then generally determine links between these proximate regions of interest and the corresponding linked tour guide audio media, and according to the user preferences will output (or store for potential later output) at least some of this tour guide media. As will be discussed, the system will also use various additional methods to provide improved tour guide media playback, as well intelligent segues between, for example, various tour guide audio media stories, depending on user preferences, location, direction, speed, map data, and the like.

BRIEF DESCRIPTION OF THE DRAWINGS

FIG. 6 shows the invention's data records for an alternate scenario where the user took the same trip as previously shown in FIGS. 2-5, but that the user preferences were either set as to not to play back history and commercial topics, or the user may have otherwise skipped playback of these topics (the user may have been driving too fast, have pressed a "skip" button, or the like). Here the system records show that the user passed by the two history and commercial marked areas, but did not hear their associated audio media files. Assuming that the user later wishes to hear what he or she has missed, the invention can use these data records to retrieve the skipped tour guide audio media files and play them back to the user at a later time (e.g. during a later trip, during a rest stop, etc.).

FIG. 7 shows an alternate embodiment of the invention, in which the tour guide media data can also comprise tour guide media data (again audio media stories in this example) that may not necessarily be linked to any geographic points or regions of interest. Instead this additional tour guide media data may be instead linked to other tour guide media, possibly even through a chain of linked media files, at least one of which are eventually then linked to a geographic activation area. In this example, audio media ID-2 is linked to a particular geographic activation area, and also has metadata showing that this audio media file is also linked to audio media file ID-3 on a related topic (e.g. more background information). However audio media ID-3 is not itself directly linked to any geographic activation area (although it could be). Depending on user preferences, if the user wishes to hear expanded audio commentary or other expanded media, then the system and method can, according to user preferences, also play back audio media ID-3 as well as audio media ID-2, depending of course on user position and/or other system settings.

DETAILED DESCRIPTION OF THE INVENTION

As previously discussed, in one embodiment, the invention may be a system, method, or device for automatically providing various types of tour guide information to users, such as audio information, text information, image graphics information, video information, linked Universal Resource Locator (URL) information, and the like. The invention will typically be implemented on one or more computerized devices, usually mobile computerized devices, such as Smartphones, tablet computers, laptop computers, or vehicle mounted computerized devices such as vehicle mounted GPS systems.

Figure 1:
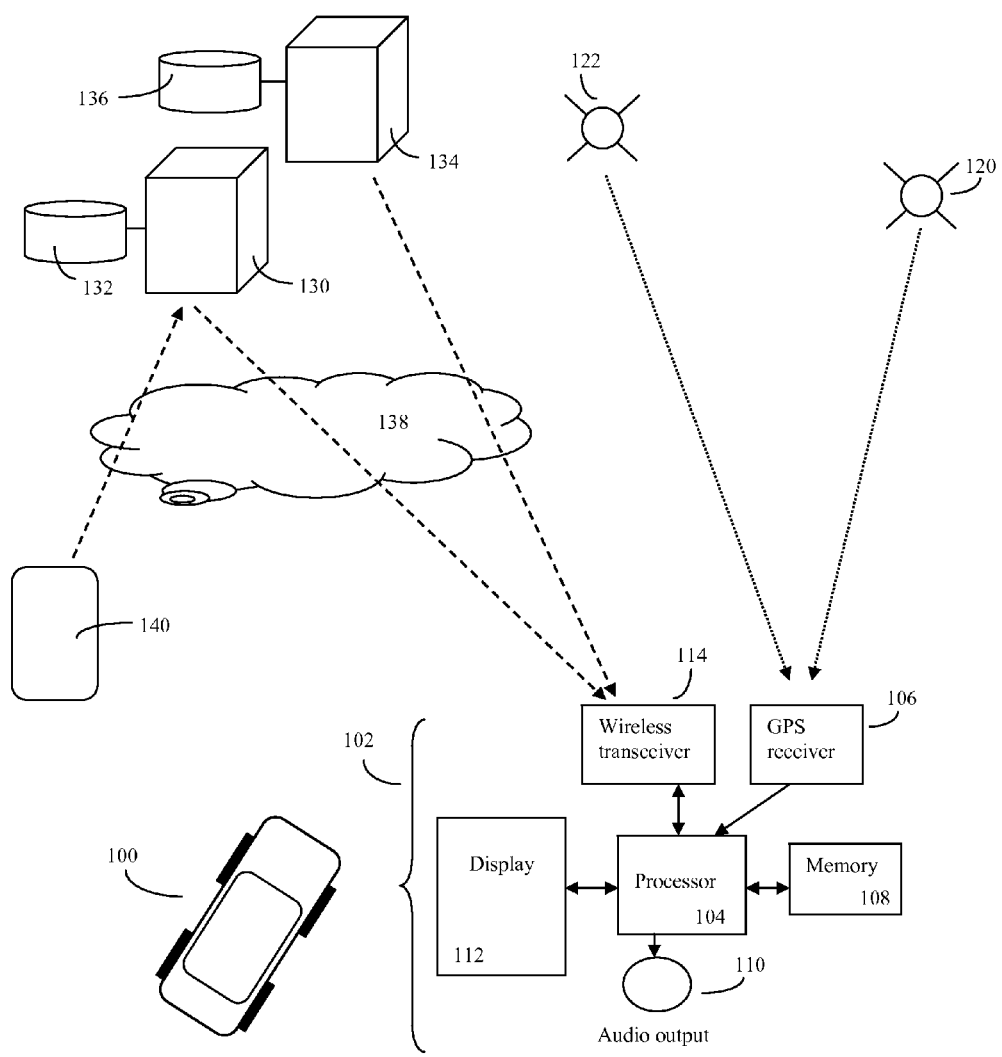
FIG. 1 shows an overview of some of the major hardware components that may be used according to the invention's systems, devices, and methods. The invention will typically use a computerized device, often GPS capable and often configured for either handheld use or as a vehicle fixture. The invention may draw upon data stored in the device's own memory, and/or may optionally use data from external data sources such as map servers or third party audio media servers. The device will often keep track of its location using Global Positioning Satellites (GPS) and a GPS receiver, or by other methods.

FIG. 1 shows an overview of some of the major hardware components that may be used according to the invention's methods. The method will often use a computerized device that itself is comprised of various components (102). This computerized device will typically comprise at least one computer processor (microprocessor/microcontroller 104), will often be equipped with a GPS receiver (106), and memory (108) (e.g. RAM, ROM, Flash memory, disk drive memory or other type memory). The computerized device will typically have at least one audio output device (110), such as a speaker, headphone or speaker jack, Bluetooth output, and the like to enable the device to output audio signals, such as sounds from various audio media files and output sources (to be discussed). The device will usually often have a display (112), often a bit-mapped touch-sensitive display, and may optionally also have a wireless transceiver (114) such as a cellular phone transceiver, WiFi transceiver, and the like to enable the device to optionally establish a wireless connection with various remote databases as desired.

In some embodiments, as previously discussed, the computerized device will be further mounted or at least associated with a user, such as a human user who in turn is riding on a vehicle such as an automobile, boat, motorcycle, bicycle, airplane and the like, or who may be walking. Here for simplicity, it will be assumed that the computerized device is being used by a human user in an automobile (100).

The device (102) may keep track of its location by various methods, including cellular phone or WiFi triangulation, internal navigation or other methods, but in a preferred embodiment may be use GPS geographic location methods or equivalent satellite navigation methods using, for example, a GPS receiver (106) and various GPS satellites (120, 122).

Although, as will be discussed, in some embodiments the invention may function using only data from onboard device memory (108), in other embodiments, the invention may also draw upon data from external databases. As an example, by using wireless transceiver (114) and Internet connection (138), the invention may optionally use mapping data (e.g. Google maps, Apple, maps, etc.) from external database(s) (136) controlled by one or more remote internet servers (134). As another example, again using wireless transceiver (114) and Internet connection (138), the invention may use tour guide media files, or such as tour guide audio media files, and associated metadata stored in one or more databases (132) controlled by one or more different remote internet server(s) (132).

As will be discussed, the invention will typically present a plurality of different tour guide media, such as a plurality of different tour guide audio media to the user during a tour. This tour guide media files may be prepared by a single source (e.g. the company or service that operates the system) or by multiple sources. In some embodiments, for example, at least some of these tour guide media files may be prepared by various devices (140) belonging to various third parties. These third parties may, for example, upload their tour guide audio media files to one or more servers (130) and databases (132), where this third party data then may be accessed by the device (102) by various methods.

As previously discussed, the computerized device will thus often be GPS capable, and often be configured for either handheld use or as a vehicle fixture. The invention may draw upon data stored in the device's own memory (108), and/or may optionally use data from external data sources such as map servers (134, 136) or various tour guide media servers (130, 132). The device will often keep track of its location using Global Positioning Satellites (GPS) (120, 122) and GPS receiver (106), or by other methods.

The user of the device, here symbolized by vehicle (100), as previously discussed should be assumed to have either actual or at least system default values of geographic location, movement direction, movement speed, and user preferences. Here for example, a device can be provided with default user preferences to begin with, which can be updated by the user later as desired. Similarly for slow speed walking tours, where user direction or speed may be difficult to ascertain, the system may fall back to using default values in such situations.

The invention will typically take tour guide media, such as tour guide audio media (e.g. audio files, text, images, URL, and the like), and either store or flag at least some of this media for potential future output to the user, or more commonly output relevant portions of this tour guide media to the user according to the user's geographic location, movement direction, movement speed and user preferences.

To do this, the invention will typically operate by obtaining access to data in at least one computer database (e.g. 108, 132, and 134). This data will generally comprise a plurality of tour guide media (e.g. audio media files) which are linked, often by associated metadata, to the circles defined by various geographic points of interest (and their corresponding radius), or the polygons defined by various geographic regions of interest.

Thus a geographic point of interest may consist of a particular geographic point (e.g. latitude, longitude, and optionally altitude) and often either circle defined by an associated radius around this geographic point, or alternatively a region, such as a polygon, that may or may not be associated with this geographic point. A geographic region of interest is here defined as a polygon with a defined geographic location (e.g. polygon vertexes such as (216) defined by latitude, longitude, and optionally altitude) which may or may not be associated with a geographic point of interest.

To generalize, both geographic points of interest and their corresponding circular areas swept out by a radius around the point of interest, and/or the geographic regions of interest, are both referred to here as "geographic activation areas". In other words, a geographic activation area is a region, either circular or polygonal, such that, when the user enters the region or at least comes within a defined distance of the region, the system can then trigger subsequent activation or playback of the tour guide media associated with the circular areas around the geographic points of interest, or the polygonal areas in the geographic regions of interest.

Note that there can be many different geographic points of interest, geographic regions of interest, and geographic activation areas in a given device database. When a user comes particularly close to a particular given point, region, or geographic activation area, that point, region, or geographic activation area that is close to the user is called a "proximate region of interest" to better distinguish it from more distant regions that are not presently activating any tour guide media playback because of their longer distance away from the user, or because they are not within eye range of the user.

The determination of which geographic activation areas represent proximate region(s) of interest may be done by various methods. One simple method is to compute the user's present location (or optionally use the user's location, movement direction, and movement speed and optionally the map data to compute a likely future location) and then determine if the user's present or computed future location is within the circle defined by a preset radius value around a geographic point of interest, or alternatively determine if the user's present or future location is or will be within the polygon defined by that particular geographic region of interest. If so, then these regions can be singled out for special attention and analysis as user proximate regions of interest.

The invention will also typically operate with various user preferences stored in memory (108), and geographic map data. Some or all of either data can be stored in device database memory (108), database memory (136), or elsewhere. In some embodiments, the geographic map data can consist of little more than a database of the various geographic locations linked to various geographic points of interest and regions of interest. In a preferred embodiment, however, the database will often comprise at least road map information, and other information (e.g. elevation information, building location information, terrain information, and the like) as desired.

As will be discussed in more detail shortly, the user preferences will, together with appropriate playback preference metadata associated with various tour guide media files, help the invention determine which types of tour guide media should be output (or stored or flagged for potential later output) during a particular tour or trip.

The invention will generally use the user's (actually the computerized device associated with the user, but here the term "user" should be construed to also refer to the user's computerized device (102) geographic location, movement direction, movement speed, geographic map data, geographic activation areas and/or geographic points of interest to determine. The invention will direct the device's computer processor(s) (104), to use these parameters determine the user proximate regions of interest wherein the geographic points of interest and/or geographic activation areas are either within visual range or close proximity of said user, or will shortly become within visual range or close proximity of the user.

The invention's processor (104) will then typically determine the links (e.g. database links, or links between different records in a database) between the user proximate regions of interest, and the various tour guide media. The invention will typically then also use the user preferences, as well as the playback preferences that linked or associated with the various tour guide media metadata, to determine which of the various tour guide media should be output to the user computerized device (e.g. output to audio output device (110) in the case of tour guide audio media, or output to display (112) in the case of tour guide text or graphic media).

Alternatively, as will be discussed, if according to user preferences or other situations, the tour guide audio media is not flagged for real-time output, then the relevant tour guide media may be tagged or otherwise stored for later playback as desired by the user.

Figure 2:
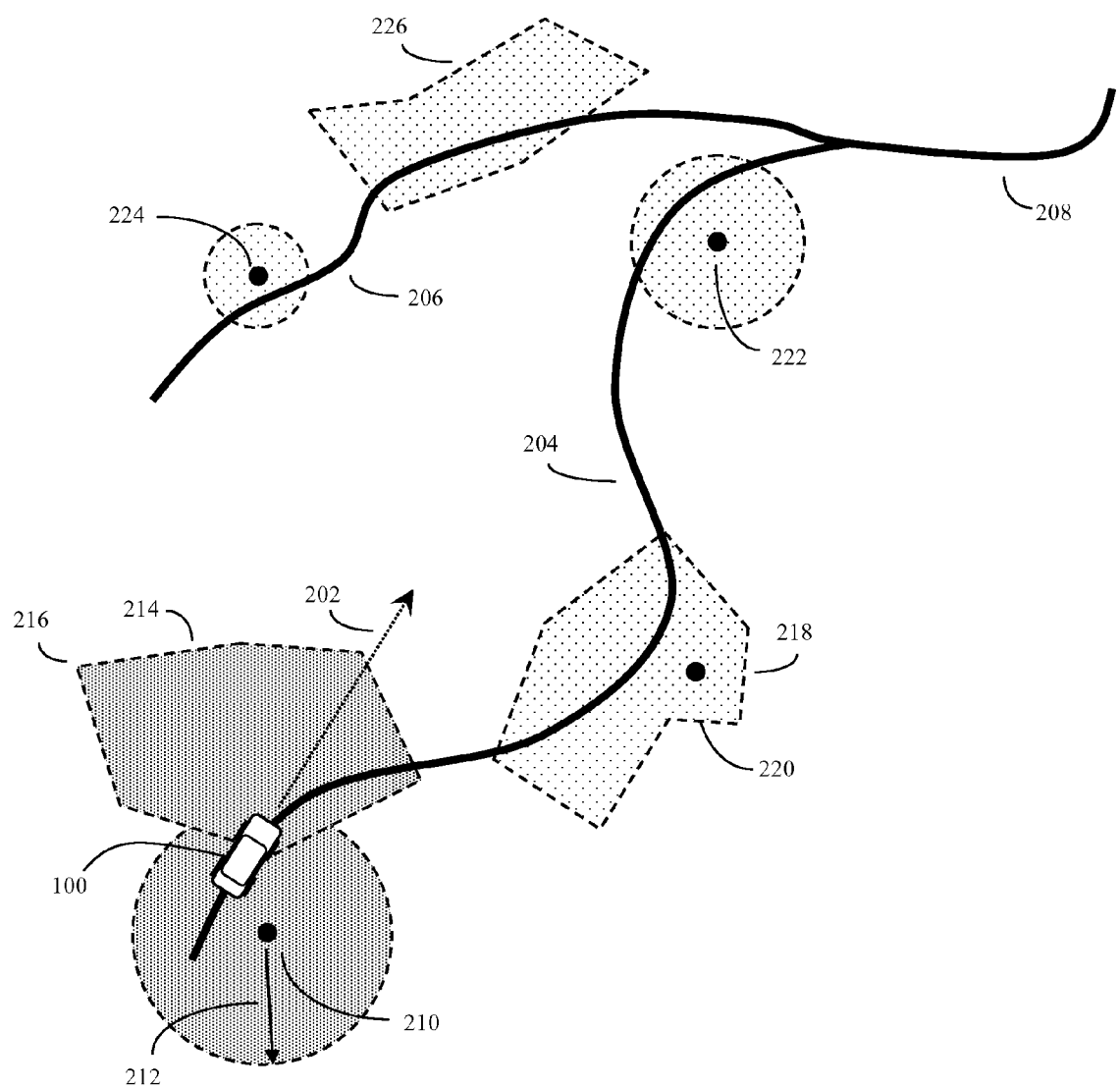
FIG. 2 shows an example of a geographic map (here a road map) with various geographic points of interest and geographic regions of interest shown. In this example, the user is in a vehicle (here an automobile) traveling along one of the roads in a certain movement direction and speed. The user is near two geographic activation areas (one is a circle formed by a radius around a geographic point of interest, and the other is a polygonal region of interest), and due to this close proximity, these two geographic activation areas are thus considered to also be "user proximate regions of interest" (darker shading).

FIG. 2 shows an example of a geographic map (here a road map with road (206) merging with road (204) to form road (208) with various geographic points of interest (e.g. 210, 222, 224) and geographic regions of interest (e.g. 214, 218, 226) shown.

The geographic location data (e.g. GPS coordinates) used to designate the various geographic points of interest (and the radius needed to designate a circle around the geographic point of interest), and geographic regions of interest may be either a part of the geographic map database, or may be a separate overlay or separate file used in conjunction with a geographic map database (e.g. a pre-existing road map geographic database). The method can operate regardless of how the geographic activation areas are designated with respect to other geographic map data, and for simplicity, the term "geographic map database" will be used to describe any combination of these data storage schemes.

In this example, the user is in a vehicle (here an automobile 100) traveling along one of the roads (204) with a certain movement direction and speed (202). As can be seen, the user is also relatively near to two geographic activation areas (one a circle with a given radius (212) around a geographic point of interest (210), and the other a polygonal region of interest (214)). Due to the user's close proximity to these two areas, these two geographic activation (210), (214) areas are thus treated by the system as "user proximate regions of interest" (darker shading), and are singled out for more detailed processing.

A human tour guide will often inform tour participants that something of interest is to the tour participant's right, left, or other direction. Similarly, in some embodiments of the invention, along with the various tour guide media associated with a particular proximate region of interest, it will be useful to also have the system inform the user as to where exactly the proximate region of interest is, relative to the user's present location.

This can be done by, for example, using the user's geographic location (100), movement direction and movement speed (202), geographic map data (e.g. the geographic track of road (204), and the geographic activation areas (210), (214) to determine the relative location and/or direction of the user proximate regions of interest (here also 210, 214) relative to the user (100). The system can then be set, for example, to then communicate (e.g. by using output device 110) the relative location and/or direction of the user proximate regions of interest (210), (214) to the user along with any tour guide media (to be discussed shortly).

In FIG. 2, for example, the system might announce tour guide audio media content with regards to geographic point of interest (210) by saying "on our right and slightly behind us is . . . ", and might announce tour guide audio media content with regards to geographic region of interest (214) by saying "on our left and slightly ahead of us".

Note that in the above example, some distance information was also conveyed in the segue message. Human tour guides can do this, and it is also desirable to have the invention do this as well.

Here the distance between the user's location (100) and the various proximate regions of interest can be automatically computed by the invention by, for example, determining the distance between the user's present geographic location, and at least one region (e.g. 210, 214) of the geographic activation areas that linked to the user proximate regions of interest. The invention can then further communicate audio information pertaining to this distance to the user, along with the tour guide audio media.

In the previous example, since the distance was quite low, the invention was programmed to use the phrase" "slightly" to indicate that the distance was minimal. If, according to another user preference setting, the system was set to also announce the likely encountering of more distant geographic regions of interest, such as region (218), then the system might alternatively be set to announce that region (218) is also getting into range of the user as: "two miles ahead of us is . . . ."

Figure 3:
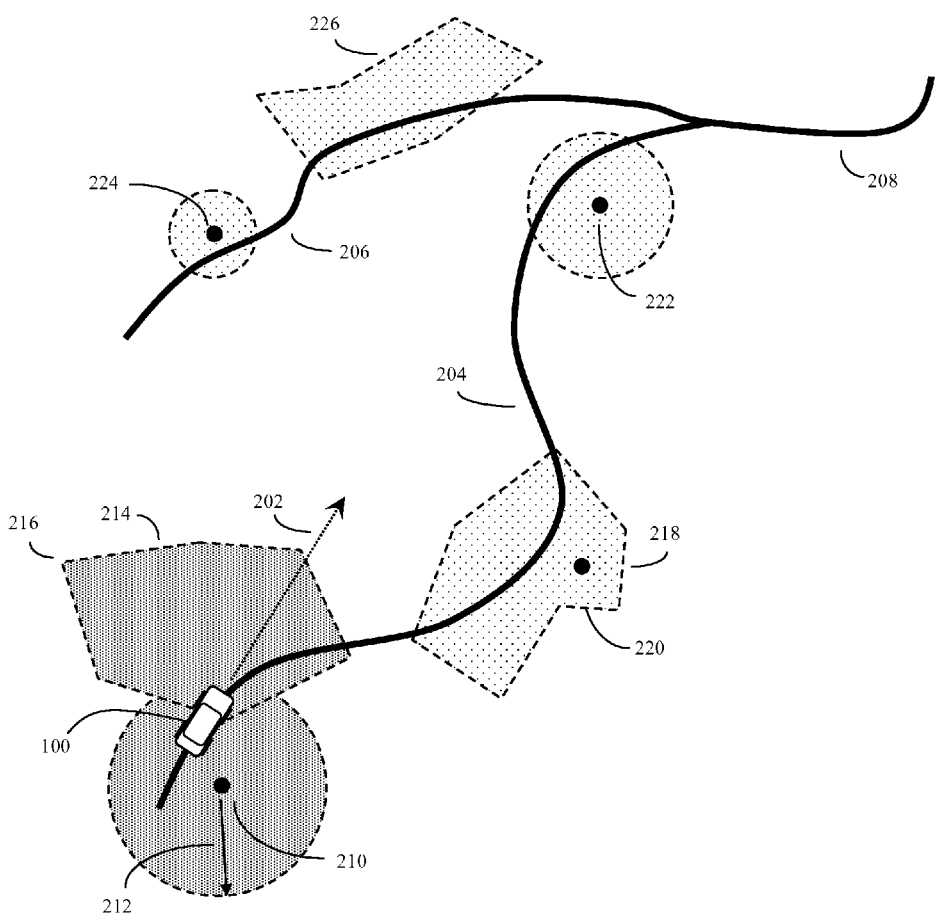
FIG. 3 shows an example of how the invention will typically use various tour guide media files, such as audio media files, that are also annotated with metadata such as links to geographic points of regions of interest, links to other audio media files, user playback preferences, previously visited tags, and audio media file playback tags. The invention draws upon this metadata to automatically provide tour guide media information (e.g. audio media stories) to the user. Here the user has just reached the first two user proximate regions of interest. The invention determines that the tour guide audio media data associated with these regions has associated metadata (here playback preferences) identifying that audio media ID-1 is for a nature topic, while audio media ID-2 is for history topic. Assuming that the system's user preferences indicate that the user desires playback of both nature and history audio media, then the system will at least start play back these audio topics, and when playback is finished may also tag the metadata with a flag indicating successful media playback.

FIG. 3 shows an example of how the invention may use a database comprising records of various tour guide media files (here audio media) (244), each with their own unique identification number (242). This data is also stored in memory in a manner (here a structured record example is used) that allows the data to be annotated with associated metadata. This associated metadata can include links to the various geographic points of regions of interest (240), optional links to other audio media files (246), various user playback preferences (e.g. preferences as to media creator (248), or preferences as to media topic (250), record fields that allow the media to be tagged as corresponding to a previously visited location (252), record fields that allow the media to be tagged as previously output or not (254). That the invention's processor can use this metadata to then can automatically provide audio tour guide information to the user in a highly sophisticated, human tour guide like, manner.

In this FIG. 3 example, the user (100) has started the trip along road (204), and has reached the first two user proximate regions of interest (circle around 210, and the region 214). The tour guide media data or files (ID-1, ID-2) associated with these regions have associated metadata such as the links to various geographic positions (240), as well as various playback preferences (various playback preference fields) (248, 250) and the like.

Here the topic playback preferences (250) identify to the system that media "ID-1" is audio media that has a nature topic, while audio media "ID-2" is audio media that has a history topic.

In this example, assuming that the system's user preferences indicate that playback of both nature and history audio media is desired, then the system will play back these audio topics (e.g. an audio story about 210, story about 214). In this example, assume that the audio media associated with these regions is being played but is not yet finished, so that the status of the previously played tag (254) is still "No".

Note that each geographic point/region of interest and associated geographic activation area can have zero, one, or more than one (e.g. a plurality) of different tour guide media associated with it. Further, each tour guide media file or data can, in turn, have data as to the contents of the media (e.g. the playback preferences) associated with it as well.

In FIG. 3 for example, geographic point of interest (210) has only one tour guide media (story about 210) associated with it, and this story was created by the system creators (e.g. not third party) and has a nature type topic. In principle, however, this point of interest could have multiple tour guide media (244) associated with it, each with multiple topics and each even from multiple sources. To automatically determine which tour guide media to play or output, the system's processor determines which tour guide media are linked to geographic activation areas close to the user (e.g. which are now user proximate regions of interest), and which have playback preferences that correspond to the user preferences. The system can then automatically select these to output (often in the form of various audio stories) to the user, often linked by various segues giving direction and distance data, and the like.

The invention can use many different types of media playback preferences, and corresponding user preferences. These media playback preferences can include language (e.g. English, Spanish, etc.), information as to media output priority (e.g. if the tour guide media is considered "core" (i.e. very important, such as pointing out the Golden Gate Bridge in a tour of San Francisco), or "non-core" (i.e. secondary importance, such as pointing out the location of a particular company headquarters in a tour of San Francisco).

Additionally, in a preferred embodiment, the invention may also keep track of if the user/device has at least recently visited a particular geographic activation area by storing a record (e.g. a flag bit, or visit time in a particular data field) (252) and also if the system had a chance to output the tour guide media associated with that activation area (254) at the time of the visit (again this can be a simple yes/no bit, or a more complex record that indicates time and even users present). As will be discussed, this data can be used by the invention along with user preferences, to automatically control tour guide media output on later tours or during other times such as during or just after rest stops, during uneventful portions of the tour, and the like.

Other media playback preferences can include the media topic, media priority (e.g. play only media above or below a certain priority level), new locations (e.g. only play the tour guide audio media associated with a never visited before (252) flag. Additional playback preferences can include a preference for the particular creator of the tour guide media (e.g. a particular user's preferences or dislike of certain particular $3^{rd}$ party media contributors), or tour guide creator rating.

Here, for example, some $3^{rd}$ party sources, such as an established travel guide source, may generally be rated higher than unknown sources either as a system default value, or as a user preference value. The content of the tour guide media can also be individually rated (e.g. using feedback from an online social network such as Facebook, Twitter, Amazon, and the like) and this can also be used.

Because the user can be close more than one user proximate geographic activation area at any given time (e.g. 210, 214), and because more than one tour guide media file may be associated with any given geographic activation area, inevitably there will be conflicts in automatically outputting the tour guide media in a graceful manner. This problem can be automatically handled by the invention according to various schemes.

As one example, if the computerized device (102) is outputting a first tour guide audio media (e.g. the "story about 210") that is linked to a first user proximate region of interest (210), and the user (100) then moves to a second user proximate region of interest (214) that is linked to a second tour guide audio media (e.g. "the story about 214"), then in one scheme (which can be set by user preference) then the system can interrupt the output of the first tour guide audio media (often with a graceful segue such as "but before I continue, let me quickly tell you about") to output the second tour guide audio media. Once this is done, the system can then (often with another graceful segue such as "returning to our earlier story"), resume output of the first tour guide audio media.

Alternatively, and as may be selected by a different user preference, the invention may use a more sophisticated scheme. Here, for example, the system may make use of information pertaining to the first geographic activation area associated with the first user proximate region of interest, and information pertaining to the second geographic activation area associated with the second user proximate region of interest, as well as the user's geographic location, movement direction, movement speed, and the relative playback time length of the first tour guide audio media and the second tour guide audio media, to optimize the order in which the first and second tour guide audio media are output to the user. As an example, if the system knows that the first tour guide media has very high priority, while the second tour guide media has marginal priority, the system may decide not to interrupt the playback of the first tour guide audio media, but instead save this or flag this second audio for possible later playback.

Figure 4:
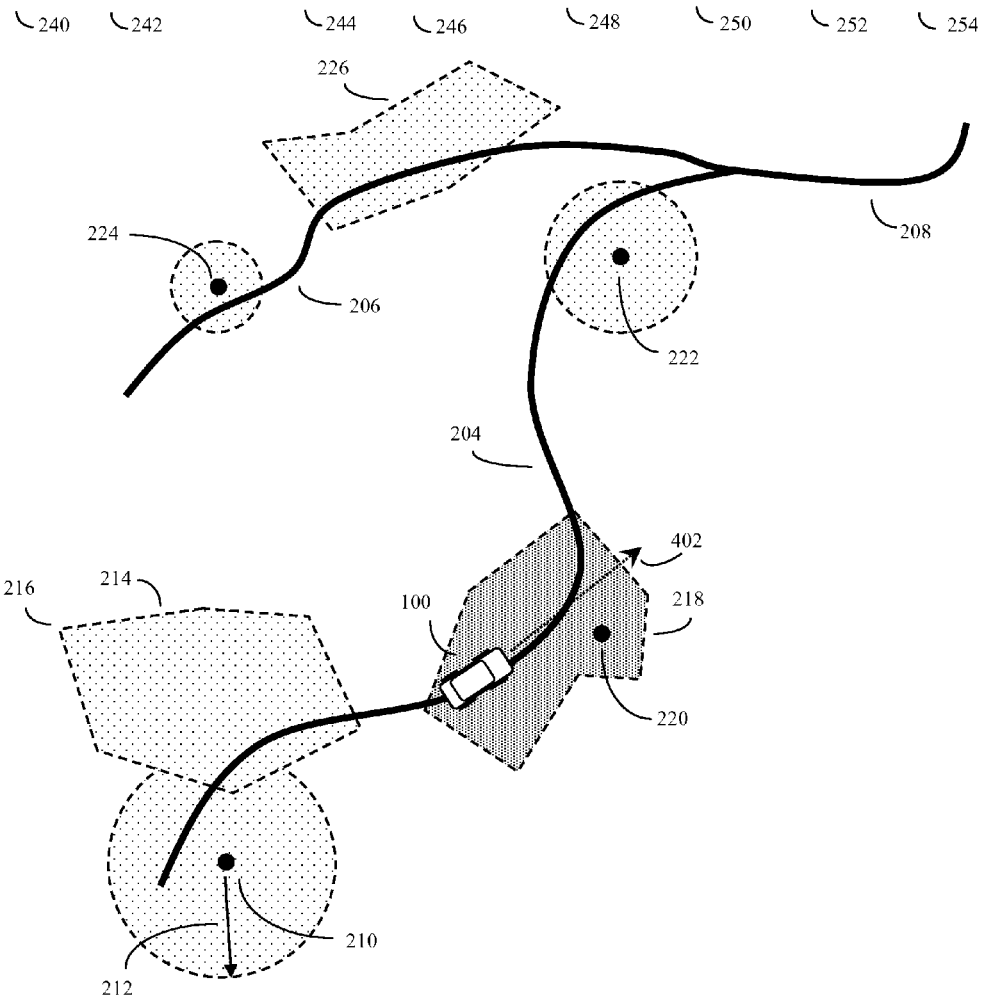
FIG. 4 shows an example of how the invention then operates further along on the same road trip. The user is has now reached a later geographic region of interest (which here is a polygon surrounding a geographic point of interest/geographic activation area). Because the user is close by, this is also the present user proximate region of interest (darker shading). The tour guide audio media data associated with this proximate region of interest has associated metadata that identifies to the system that the audio media's ID-3 playback preferences indicate a cultural topic. In this example, assume that the user wants to hear cultural audio media as well (i.e. the user preferences also indicate that cultural content is desired). Thus the system knows to play back this audio media ID-3, and flag successful media playback when this process is complete.

FIG. 4 shows an example of how the invention handles the same user, now further along on the user's road trip. The user is has now reached a later geographic region of interest (218) (which here is a polygon surrounding a geographic point of interest (220)) which is also the geographic activation area and (by virtue of the user's proximity), the present user proximate region of interest as well (darker shading). The tour guide audio media data or file ("Story about 218" or ID 3) associated with this proximate region of interest (218) has associated metadata (i.e. is tagged or linked with) that identifies to the system that the audio media's ID-3 playback preferences shows that the media pertains to a cultural topic (250).

In this example, assume that the user wants to hear cultural audio media as well (i.e. that the user preferences also indicate that audio media and cultural topics are desired). Here, the user (100) has visited (is inside of) region of interest (218) and thus the system has set the "visited" flag (252) to "Yes". However, because in this example, the audio media ID-3 may not be fully output yet, and thus the "played" flag (254) is still set to "No" until playback is complete.

Alternatively, if the user preferences are: "Do not play back cultural tour guide media", then the story about (218) would not be automatically played back by the system, because this tour guide media's playback preference data (250) indicate that the media is a cultural topic.

Figure 5:
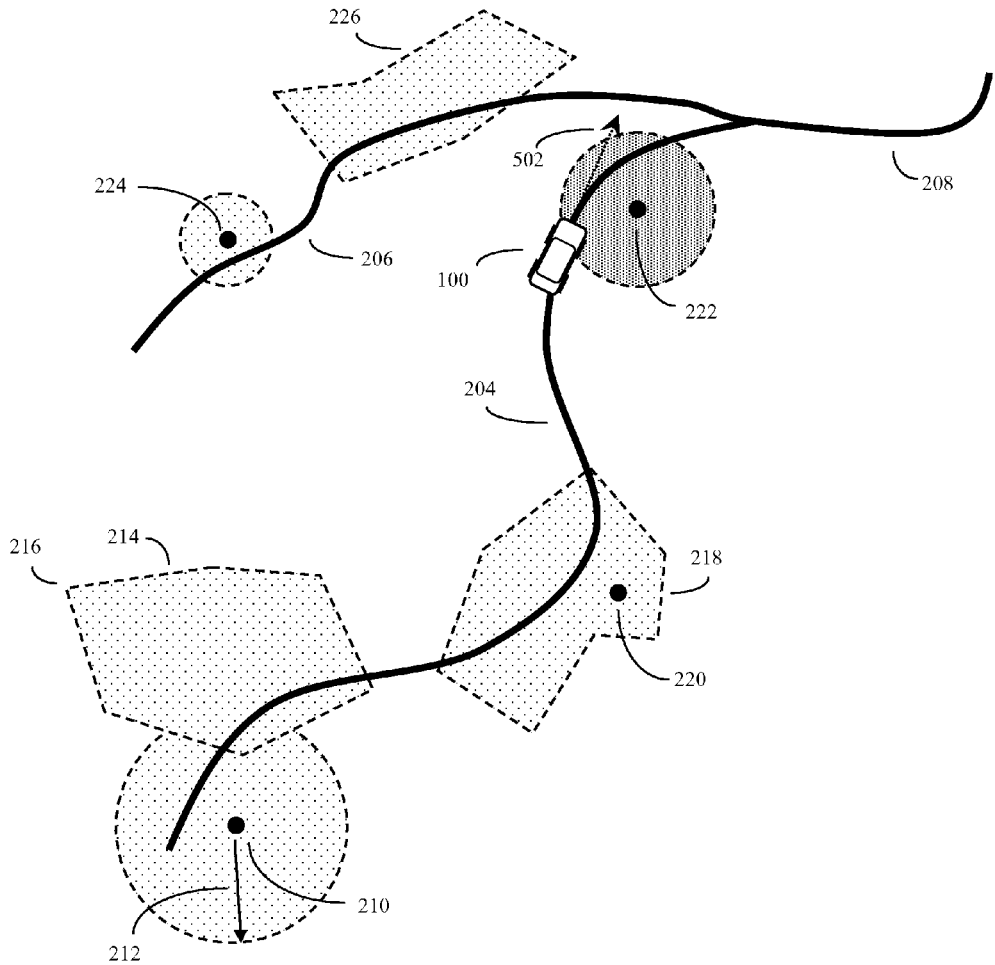
FIG. 5 shows an example of how the invention operates even further along on the user's road trip. At this point, the system has stored database records that the user has visited the various previous positions. The user now has reached a still later geographic activation area based on a circle with given radius surrounding a geographic point of interest. Again, by virtue of the user's proximity, this is also now the user's proximate region of interest (darker shading). In this example, the tour guide audio media associated with this position was provided by a third party, possibly through an internet server and a wireless network connection. Assuming that the user's preferences allow playback of $3^{rd}$ party provided audio media with commercial topics, then this $3^{rd}$ party media will be played back as well, and otherwise it will not. In this example, let us assume that the present user preferences are to not play $3^{rd}$ party commercial topics.

FIG. 5 shows an example of how the invention again handles the same user, now even further along on the user's road trip (tour). At this point, the system has stored a series of records or flags (252) showing that the user had visited a number of various previous positions (such as 210, 214, and 218) in previous FIGS. 3-4. In FIG. 5, the user now has reached a still later circle defined by a radius surrounding a geographic point of interest (222). This circle represents the current geographic activation area that, by virtue of the user's proximity, is also now the present user proximate region of interest (darker shading).

In this example, the tour guide media ("Story about 222", ID-4) associated with this position (222) was provided by a third party (140, see also field 248), possibly through an Internet server/database (130/132) and a wireless network connection (138, 114). The playback preferences metadata (248, 250) associated with this tour guide media thus are labeled by the system as "$3^{rd}$ party" (possibly using the $3^{rd}$ party's name or ID, and "Commercial". Other playback preferences, such as media rating or $3^{rd}$ party rating, are not shown.

Assuming that the user's preferences are consistent with a user desire to listen or otherwise receive this $3^{rd}$ party provided audio media with commercial topics, then the "Story about 222" ID-4 will be played back as well. Otherwise it will not. In this example, let us assume that the user preferences do not include a preference for $3^{rd}$ party commercial topics, and so this "Played" flag (254) will remain set to "No".

Note that this scheme allows for various interesting business possibilities. For example, in some embodiments, the invention can be configured so that if the user is open to receiving such tour guide media such as $3^{rd}$ party commercials, then the cost of the system might be subsidized. Alternatively a user might prefer not to hear distracting $3^{rd}$ party commercial tour guide audio media, but instead pay a higher price for using the system.

As another example, a user might pay extra to receive $3^{rd}$ party data from a reputable travel guide source, such as Frommers, Michelin®, and the like.

Queues of Missed Tour Guide Media:

As previously discussed, in some embodiments, the invention may be configured to preserve a record of sites that the user has visited, but has not yet received the tour guide media associated with the sites (e.g. (252, 254). Here for example, the method may store a record of which tour guide audio media have been output to the user computerized device and which tour guide audio media, or links to said tour guide audio media have been stored for later output in the memory of said computerized device. Here this storage could be as simple as a "not output yet" bit, or as complex as a complete separate record of the "story about 218".

The system can then use this record (e.g. fields 252, 254) in various ways. In one embodiment, it may automatically display to the user (e.g. using display screen 112) which tour guide audio media have been stored for later output and/or which tour guide media have previously been output. The user can then select some or all of the previously output or stored for later output tour guide audio media for subsequent output.

In other embodiments, the system may be configured (according to user preference) to automatically play back some or all of the skipped tour guide media during more uneventful parts of the tour. Other options are also possible.

FIG. 6 shows the invention's data records for an alternate scenario where the user took the same trip as previously shown in FIGS. 2-5, but where the user preferences were either set as to not to play back history and commercial topics, or the user may have otherwise skipped playback of these topics (the user may have been driving too fast, or have pressed a "skip" button, and the like). Here the system records show that the user passed by the two areas (210) and (214), but did not hear their associated audio media files (note that the played field (254) shows a "0").

(Note by the way, that the "visited" field (252) or "Played" field (254) can alternatively record the number of visits or plays, or the time of visits or played, or even the user location and user ID at the time of visit or play. In FIG. 6, this alternative is shown by using the numbers "0" and "1" in field (254).

Assuming that the user later wishes to hear what he or she has missed, invention can use these data records (252, 254) to automatically search for visited but no media output records, retrieve the skipped tour guide media files and play them back to the user at a later time (e.g. during a later trip, during a rest stop, etc.).

In some embodiments, second or subsequent tour guide media files may be linked to one or more first tour guide media files that themselves are linked to geographic activation areas, and used, for example, to supplement the first tour guide media files with additional content. Consider for example, a tour of San Francisco, where various first tour guide media files linked to certain geographic activation areas can be additionally supplemented by various second tour guide audio media files that contain more detailed information about the region's history.

More specifically, in this embodiment, at least a first tour guide media may be linked to at least some user proximate regions of interest, and a second tour guide media may be linked to the first tour guide media. Both the first and second tour guide media may in turn be linked with metadata such as their respective playback preferences.

The invention may use the user preferences to determine, as previously discussed, which of the first tour guide audio media is output to the user's computerized device. Additionally, in the case where the system database (often stored in memory (108) also comprises links between at least some of the first tour guide audio media and second tour guide audio media, the invention can use the user preferences to determine which of the second tour guide audio media to also output to the user's computerized device, or at least store or flag for later output.

Putting this in a simpler manner, the invention's database may also contain some "second" tour guide media files that are linked to other "first" tour guide media files, and which may only be played back as when the first tour guide media files are activated by virtue of the user being within the first tour guide media file's user proximate range of interest.

This type of "$2^{nd}$" tour guide media linked to other $1^{st}$ tour guide media" scheme is shown in FIG. 7. In FIG. 7, the as previously discussed, the various tour guide media data additionally comprise "second" tour guide audio media (ID-3) that may not necessarily be linked to any geographic points or regions of interest, but rather may be only linked to other tour guide media (ID-2). Note that in this scheme, $2^{nd}$ tour guide media ID-3 could also link to other linked stories as well (although here it does not).

Thus to further elaborate, in FIG. 7, tour guide media ID-3, "$2^{nd}$: Story of topic related to 214" is not itself linked to any particular geographic region (note the blank in position link field (240)). Instead the only way that the invention can access tour guide media ID-3 in this example is via the linked story (field 246) pointer or link that in turn is associated with tour guide media ID-2.

Thus in this example, audio media ID-2 is linked to a particular geographic activation area (214), and also has metadata links (field 246) showing that this audio media file is also linked to audio media file ID-3 on a related topic (e.g. more background information). Although in this example, audio media ID-3 is not itself directly linked to any geographic activation area, it could be.

Depending on user preferences, if a user wishes to hear expanded audio commentary, they can set their user preferences to "allow output on related topics". Given this user preference setting, then the invention is also directed to play back tour guide media ID-3, as well as tour guide media ID-2, when the user reaches geographic area (214).

Thus, with the user preference: "give expanded audio commentary" set to "Yes", then the user will hear:

"$1^{st}$ Story about 214" followed by "$2^{nd}$ story of topic related to 214".

By contrast, with the user preference "give expanded audio commentary" set to "No", then the user will only hear:

"$1^{st}$ Story about 214".

Other Options

In some embodiments, it may be useful to further use 3D map elevation data to determine when a particular geographic activation area is within eyesight of the user (at a given user location), and use this information to help further define what geographic activation areas should be treated as a user proximate region of interest, and which should not.

In this embodiment, the geographic map data will generally comprise 3D geographic map data that, in addition to the latitude and longitude, will also give altitude or elevation data. The invention can thus use the comparative elevation of the user's geographic location (which can usually be deduced using the geographic map data and the user position, at least when the user is on the ground), as well as the comparative elevation of any intervening geographic map elements, and the comparative elevation of a given geographic activation area of interest, and determine if this geographic activation area would be is visible to the user. If it is visible, then according to user preference settings, the system can then automatically consider this geographic activation area a proximate region of interest.

For example, although while on the ground near sea level, the user touring the San Francisco Bay area may be more than 10 miles away from the Golden Gate bridge—normally too far away for this bridge to be considered a user proximate region of interest, if the same user drives to the top of the hill, the Golden Gate bridge may now be visible, even though the user is still more than 10 miles away. In this embodiment, the system can compute probable visibility, give a useful segue such as "to your right, ten miles away, is the" as a segue, and then also output the tour guide audio media story regarding the Golden gate bridge. The system can keep track of the fact that this story was previously output, and avoid boring the user (again according to user preferences) by subsequently repeating the story multiple times as the user gets closer to the bridge.

By combining these various elements, the invention may automatically produce a very human like tour guide experience. The invention uses more realistic polygonal geographic regions of interest, can take elevation view data into account, and can also take the user's interests and preferences into account as to which tour guide media to output, give information on related topics as desired, can point out areas of interest by human like "to the left and about two miles away" messages, can keep track of what has been played back previously, and can fill in dull parts of the tour with skipped commentary from earlier as desired. The invention can additionally make use of third party supplied media to supplement the tour guide experience.

The invention claimed is:

1. A method of automatically providing, to a user having a geographic location, movement direction, movement speed, and user preferences, tour guide media, said media stored or output according to a user's geographic location, movement direction, movement speed and user preferences, said method comprising:
   obtaining access to data in at least one computer database, said data comprising:
   a: a plurality of tour guide media linked to geographic points or regions of interest, at least some of said tour guide media characterized by tour guide media topic;
   b: geographic activation areas, said geographic activation areas being linked with either said geographic points or regions of interest;
   c: user preferences, at least some of said user preferences being media topic playback preferences;
   d: geographic map data;
   using said user's geographic location as determined by an automated location determination method, movement direction, movement speed, geographic map data, geographic activation areas and/or geographic points of interest to determine, using a computer processor, user-proximate regions of interest wherein said user-proximate regions of interest comprise geographic points of interest and/or geographic activation areas are either within visual range or close proximity of said user, or will shortly become within visual range or close proximity of said user;
   using said computer processor to determine the links between said user proximate regions of interest and said tour guide media; and
   storing for later output, or outputting, to a user computerized device according to a match between said tour guide media topic and said media topic playback preferences, at least some of the tour guide media that are linked to said proximate regions of interest;
   wherein if said computerized device is outputting a first tour guide media linked to a first user proximate region of interest, and said user then moves to a second user proximate region of interest linked to a second tour guide media, then according to said user preferences:
   using information pertaining to a first geographic activation area associated with the first user proximate region of interest, and information pertaining to a second geographic activation area associated with the second user proximate region of interest, as well as said user geographic location, movement direction, movement speed, and a relative playback time length of said first tour guide media and said second tour guide media, to optimize the order in which said first and second tour guide media are output to said user, as well as to determine the relative times in which the two tour guide media are stored or output to said user.

2. The method of claim 1, wherein said geographic activation areas are defined as polygons on a map or map projection of said geographic map data, and wherein at least some of said polygons overlap with any linked geographic points of interest.

3. The method of claim 2, wherein said proximate regions of interest are determined by computing if a user's present location or computed future location is within a radius of said geographic point of interest;
   wherein said computed future location is determined by using a computer processor and said user's present location, movement-direction, speed, and geographic map data to determine a user's computed future location,
   and wherein said proximate regions of interest are also determined by computing if said user's present or computed future location is within said proximate regions of interest.

4. The method of claim 1, wherein said geographic map data comprises 3D geographic map data, further automatically using a comparative elevation of said user geographic location, a comparative elevation of any intervening geographic map elements that will impact visibility of said geographic activation areas, and a comparative elevation of said geographic activation areas to further determine which said geographic activation areas are either within visual range of said user or will shortly become within visual range of said user, and thus should be analyzed as proximate regions of interest.

5. The method of claim 1, further using said user's geographic location, movement direction, movement speed, geographic map data, and geographic activation areas to determine a relative location and/or direction of said user-proximate regions of interest relative to said user; and
   additionally communicating said relative location and/or direction of said user proximate regions of interest to said user along with said tour guide media.

6. The method of claim 5, wherein determining the relative location and/or direction of said user proximate regions of interest, relative to said user, is done by using a user's direction of movement to further determine a probable user orientation, and determining the direction of the proximate region of interest's geographic activation areas as being to the left or right or behind or other direction relative to said probable user orientation and user location using said geographic map data.

7. The method of claim 5, further determining a distance between a user's present geographic location and at least one region of the geographic activation areas linked to said user proximate regions of interest, and further communicating information pertaining to this distance to said user along with said tour guide media.

8. The method of claim 1, wherein at least some said tour guide media comprises first tour guide media and second tour guide media;
   wherein at least some said first tour guide media is linked to at least some user proximate regions of interest, and at least some said second tour guide media is linked to at least some first tour guide media, further using said user preferences to determine which of said first tour guide media is output to said user computerized device, and/or
   wherein said database further comprises links between at least some of said first tour guide media that is linked to at least some user proximate regions of interest, and second tour guide media, further using said user preferences to determine which of said second tour guide media to also output to said user computerized device, or store or flag for later output.

9. The method of claim 1, wherein said user preferences comprise preferred tour guide media playback preferences, and at least some geographic points of interest and/or geographic activation areas have a plurality of different linked tour guide media categorized according to playback preference;
   wherein said preferred tour guide media playback preferences are further used to select which tour guide media to store or output on said user computerized device.

10. The method of claim 9, wherein said preferred tour guide media playback preferences comprise one or more preferences selected from the group consisting of media audio, graphic, text or URL type, core media, previously played media, media topic, media priority, new locations, used queued media, use same topic media, use unfinished media topic, use same subject media, use unrelated topic media, media priority, media creator type, media creator identifier, media creator rating, and media content rating.

11. The method of claim 1, further storing a record of which tour guide media have been output to said user computerized device, and which tour guide media, or links to said tour guide media, have been stored for later output in a memory of said computerized device;
   further using said record to output to said user which tour guide media have been stored for later output and/or which tour guide media have previously been output;
   and/or allowing said user to select some or all of the previously output or stored for later output tour guide media for subsequent output.

12. The method of claim 1, wherein at least some of said data resides in a remote computer database, and wherein obtaining at least some of said data is done by using a wireless network connection to a remote computer server over the Internet;
   wherein said user computerized device is a smartphone, tablet computer, or computerized vehicle device equipped with GPS functionality; and
   wherein at least some of said tour guide media is prepared by third party sources, and is uploaded to said remote computer database.

13. A method of automatically providing, to a user having a geographic location, movement direction, movement speed, and user preferences, tour guide media, said media stored or output according to a user's geographic location, movement direction, movement speed and user preferences, said method comprising:
   obtaining access to data in at least one computer database, said data comprising:
   a: a plurality of tour guide media linked to geographic points or regions of interest, at least some of said tour guide media characterized by tour guide media topic;
   b: geographic activation areas, said geographic activation areas being linked with either said geographic points or regions of interest;
   c: user preferences, at least some of said user preferences being media topic playback preferences;
   d: geographic map data;
   using said user's geographic location as determined by an automated location determination method, movement direction, movement speed, geographic map data, geographic activation areas and/or geographic points of interest to determine, using a computer processor, user-proximate regions of interest wherein said user-proximate regions of interest comprise geographic points of interest and/or geographic activation areas are either within visual range or close proximity of said user, or will shortly become within visual range or close proximity of said user;
   wherein said geographic map data comprises 3D geographic map data, further automatically using a comparative elevation of said user geographic location, a comparative elevation of any intervening geographic map elements that will impact visibility of said geographic activation areas, and a comparative elevation of said geographic activation areas to further determine which said geographic activation areas are either within visual range of said user or will shortly become within visual range of said user, and thus should be analyzed as proximate regions of interest;
   using said computer processor to determine the links between said user proximate regions of interest and said tour guide media; and
   storing for later output, or outputting, to a user computerized device according to a match between said tour guide media topic and said media topic playback preferences, at least some of the tour guide media that are linked to said proximate regions of interest.

14. The method of claim 13, wherein at least some of said data resides in a remote computer database, and wherein obtaining at least some of said data is done by using a wireless network connection to a remote computer server over the Internet;
   wherein said user computerized device is a smartphone, tablet computer, or computerized vehicle device equipped with GPS functionality; and
   wherein at least some of said tour guide media is prepared by third party sources, and is uploaded to said remote computer database.

15. A method of automatically providing, to a user having a geographic location, movement direction, movement speed, and user preferences, tour guide media, said media stored or output according to a user's geographic location, movement direction, movement speed and user preferences, said method comprising:
   obtaining access to data in at least one computer database, said data comprising:
   a: a plurality of tour guide media linked to geographic points or regions of interest, at least some of said tour guide media characterized by tour guide media topic;
   b: geographic activation areas, said geographic activation areas being linked with either said geographic points or regions of interest;
   c: user preferences, at least some of said user preferences being media topic playback preferences;
   d: geographic map data;
   using said user's geographic location as determined by an automated location determination method, movement direction, movement speed, geographic map data, geographic activation areas and/or geographic points of interest to determine, using a computer processor, user-proximate regions of interest wherein said user-proximate regions of interest comprise geographic points of interest and/or geographic activation areas are either within visual range or close proximity of said user, or will shortly become within visual range or close proximity of said user;
   using said computer processor to determine the links between said user proximate regions of interest and said tour guide media;
   storing for later output, or outputting, to a user computerized device according to a match between said tour guide media topic and said media topic playback preferences, at least some of the tour guide media that are linked to said proximate regions of interest; and further storing a record of which tour guide media have been output to said user computerized device, and which tour guide media, or links to said tour guide media, have been stored for later output in a memory of said computerized device;

further using said record to output to said user which tour guide media have been stored for later output and/or which tour guide media have previously been output;

and/or allowing said user to select some or all of the previously output or stored for later output tour guide media for subsequent output.

16. The method of claim 15, wherein at least some said tour guide media comprises first tour guide media and second tour guide media;

wherein at least some said first tour guide media is linked to at least some user proximate regions of interest, and at least some said second tour guide media is linked to at least some first tour guide media, further using said user preferences to determine which of said first tour guide media is output to said user computerized device, and/or wherein said database further comprises links between at least some of said first tour guide media that is linked to at least some user proximate regions of interest, and second tour guide media, further using said user preferences to determine which of said second tour guide media to also output to said user computerized device, or store or flag for later output.

17. The method of claim 15, wherein said user preferences comprise preferred tour guide media playback preferences, and at least some geographic points of interest and/or geographic activation areas have a plurality of different linked tour guide media categorized according to playback preference;

wherein said preferred tour guide media playback preferences are further used to select which tour guide media to store or output on said user computerized device.

18. The method of claim 17, wherein said preferred tour guide media playback preferences comprise one or more preferences selected from the group consisting of media audio, graphic, text or URL type, core media, previously played media, media topic, media priority, new locations, used queued media, use same topic media, use unfinished media topic, use same subject media, use unrelated topic media, media priority, media creator type, media creator identifier, media creator rating, and media content rating.

19. The method of claim 15, wherein at least some of said data resides in a remote computer database, and wherein obtaining at least some of said data is done by using a wireless network connection to a remote computer server over the Internet;

wherein said user computerized device is a smartphone, tablet computer, or computerized vehicle device equipped with GPS functionality; and wherein at least some of said tour guide media is prepared by third party sources, and is uploaded to said remote computer database.

* * * * *